United States Patent
Lutian et al.

(10) Patent No.: US 9,722,793 B2
(45) Date of Patent: Aug. 1, 2017

(54) PERSONAL IDENTIFICATION VIA ACOUSTICALLY STIMULATED BIOSPECKLES

(71) Applicant: MICROSOFT TECHNOLOGY LICENSING, LLC, Redmond, WA (US)

(72) Inventors: John Michael Lutian, Bellevue, WA (US); Sergey Ulyanov, Saratov (RU)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 14/848,774

(22) Filed: Sep. 9, 2015

(65) Prior Publication Data

US 2017/0070347 A1    Mar. 9, 2017

(51) Int. Cl.
| | |
|---|---|
| *G06K 9/00* | (2006.01) |
| *H04L 9/32* | (2006.01) |
| *G06F 11/32* | (2006.01) |
| *G06F 21/32* | (2013.01) |

(52) U.S. Cl.
CPC ............ *H04L 9/3231* (2013.01); *G06F 11/32* (2013.01); *G06F 21/32* (2013.01); *G06K 9/0002* (2013.01); *G06K 9/0004* (2013.01); *G06K 9/00033* (2013.01); *G06K 9/00087* (2013.01); *G06K 2009/0006* (2013.01)

(58) Field of Classification Search
None
See application file for complete search history.

(56) References Cited

U.S. PATENT DOCUMENTS

| 7,088,455 | B1* | 8/2006 | Kirkpatrick | G01N 21/1717 356/502 |
|---|---|---|---|---|
| 7,123,363 | B2 | 10/2006 | Puttappa et al. | |
| 7,708,695 | B2 | 5/2010 | Akkermans et al. | |
| 7,715,016 | B2* | 5/2010 | Hwang | G01B 11/002 345/166 |
| 7,817,256 | B2 | 10/2010 | Fujii et al. | |
| 7,844,083 | B2 | 11/2010 | Fujii et al. | |
| 7,864,306 | B2 | 1/2011 | Kono et al. | |
| 7,869,624 | B2 | 1/2011 | Takiguchi | |

(Continued)

FOREIGN PATENT DOCUMENTS

| EP | 0630504 B1 | 5/2000 |
|---|---|---|
| EP | 1259930 B1 | 6/2005 |
| WO | 2014124167 A1 | 8/2014 |

OTHER PUBLICATIONS

Sandstraom, Marie, "Liveness Detection in Fingerprint Recognition Systems", In Master's Thesis Jun. 14, 2004, 149 Pages.

(Continued)

*Primary Examiner* — Sumati Lefkowitz
*Assistant Examiner* — David Perlman
(74) *Attorney, Agent, or Firm* — Workman Nydegger (57) ABSTRACT

An optical sensing device can receive a speckle pattern generated by a laser's interaction with acoustically stimulated tissue. A computing device can identify one or more characteristics within the received speckle pattern. The computing device can then identify a match of the one or more characteristics to a user biometric signature stored within a storage device. Based upon the identified match, the system can authenticate a user within a computer system.

21 Claims, 7 Drawing Sheets

(56) References Cited

U.S. PATENT DOCUMENTS

| | | | |
|---|---|---|---|
| 7,925,056 B2 | 4/2011 | Presura et al. | |
| 8,649,568 B2 | 2/2014 | Sato | |
| 8,660,324 B2 | 2/2014 | Byren et al. | |
| 8,687,856 B2 | 4/2014 | Bower et al. | |
| 8,780,182 B2 | 7/2014 | Byren | |
| 2011/0013002 A1 | 1/2011 | Thompson et al. | |
| 2011/0026783 A1 | 2/2011 | Fujii et al. | |
| 2011/0235871 A1* | 9/2011 | Byren | G06K 9/2036 382/124 |
| 2013/0204112 A1* | 8/2013 | White | A61B 5/0261 600/407 |
| 2014/0219521 A1 | 8/2014 | Schmitt et al. | |

OTHER PUBLICATIONS

Kirkpatrick, et al., "Micromechanical Behavior of Cortical Bone as Inferred from Laser Speckle Data", In Journal of Biomedical Materials Research, Apr. 1998, pp. 372-379.

Zalevsky, et al., "Simultaneous Remote Extraction of Multiple Speech Sources and Heart Beats from Secondary Speckles Pattern", In OSA Publishing, Optics Express, vol. 17, Issue 24, Nov. 2009, pp. 21566-21580.

Beiderman, et al., "Remote Estimation of Blood Pulse Pressure Via Temporal Tracking of Reflected Secondary Speckles Pattern" In Journal of Biomedical Optics, vol. 15, Issue 6, Nov. 22, 2010, pp. 1-7.

Beiderman, et al., "Demonstration of Remote Optical Measurement Configuration that Correlates to Glucose Concentration in Blood", In Proceedings of Biomedical Optics Express, vol. 2, Issue 4, Apr. 1, 2011, pp. 858-870.

International Search Report and Written Opinion issued in PCT Application No. PCT/US2016/050763 mailed Nov. 28, 2016.

* cited by examiner

PERSONAL IDENTIFICATION VIA ACOUSTICALLY STIMULATED BIOSPECKLES

BACKGROUND

Computing technology has revolutionized the way we work, play, and communicate. However, the increased presence of computing technology in day-to-day life has led to a significant increase in security risks relating to digital data and computing resources. To control access to data and computing resources, a password and/or username have been used as an initial authentication measure within conventional computing devices. While a password can provide at least an initial level of security, passwords are only beneficial when they cannot be guessed or otherwise derived by a malicious actor.

Due to the difficulty users tend to have with remembering increasingly longer and more complex passwords, many computer security systems have begun to incorporate biometric authentication. A common method of biometric authentication involves digitally imaging an individual's fingerprint and matching the fingerprint to an authorized user. As such, biometric authentication can allow a user to have a highly complex biometric password (e.g., a fingerprint), while not necessarily requiring the user to recall from memory a long and complex password. Unfortunately, recent research has made it increasingly clear that conventional, simple fingerprint authentication schemes can be readily defeated. For example, in at least some cases, a fingerprint scanner can be defeated with a simple picture of an authorized individual's fingerprint.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a computing system for identifying a user through a biometric signature. An acoustic transducer can acoustically stimulate tissue belonging to an individual. A laser (also referred to herein as a "laser device") can also illuminate at least a portion of the stimulated tissue. An optical sensing device can then receive a speckle pattern generated by the laser's interaction with the stimulated tissue. A computing device can identify one or more characteristics within the received speckle pattern. The computing device can then identify a match of the one or more characteristics to a user biometric signature stored within a storage device. Based upon the identified match, the system can authenticate a user within a computer system.

Additional embodiments described herein relate to a biometric security device for authenticating one or more users based upon a speckle pattern. The biometric device can comprise an acoustic transducer positioned near a tissue-receiving portion of the biometric security device. The acoustic transducer can be configured to stimulate tissue belonging to an individual. A laser device can be configured to illuminate at least a portion of the stimulated tissue. An optical sensing device can be positioned to receive a speckle pattern generated by the interaction of the laser with the stimulated tissue. A computing device can be configured to determine an identity of the individual based upon one or more characteristics of the received speckle pattern.

Further, at least one embodiment described herein relates to a method for identifying a user through a biometric signature. The method can comprise receiving at an optical sensing device a speckle pattern generated by a laser's interaction with the stimulated tissue. The method can also comprise identifying at a computing device one or more characteristics within the received speckle pattern. Additionally, the method can comprise identifying a match of the one or more characteristics to a user biometric signature stored within a storage device. Further, the method can comprise authenticating a user within a computer system based upon the identified match.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to a computing system for identifying a user through a biometric signature. An acoustic transducer can acoustically stimulate tissue belonging to an individual. A laser (also referred to herein as a "laser device") can also illuminate at least a portion of the stimulated tissue. An optical sensing device can then receive a speckle pattern generated by the laser's interaction with the stimulated tissue. A computing device can identify one or more characteristics within the received speckle pattern. The computing device can then identify a match of the one or more characteristics to a user biometric signature stored within a storage device. Based upon the identified match, the system can authenticate a user within a computer system. Thus, a system is described that authenticates a user based upon a speckle pattern.

In various embodiments described herein, a biometric authentication system can authenticate an individual based upon identifiable characteristics in a speckle pattern that is generated from acoustically stimulated tissue (also referred to as "biospeckles"). While the laser speckle pattern can be generated by a laser illuminating any tissue belonging to a target individual, for the sake of simplicity and clarity, the exemplary tissue discussed herein will relate to an individual's finger and associated finger structure; however, the biometric authentication system disclosed herein can be practiced with tissue other than a finger. As such, embodiments of the present invention comprise a laser illuminating a target individual's finger, an acoustic transducer stimulating the finger, and an optical receiving device for receiving a speckle pattern generated by the laser light's interaction with the finger.

The optical receiving device can communicate the received speckle pattern to a computing device for analysis. As used herein, a computing device can comprise one or more processor, one or more remote computing platforms, a field programmable gate array, an application specific integrated circuit, or any other electronic computation device. In various embodiments, the computing device may be located locally with the optical receiving device or may be located remotely, such that at least a portion of the speckle pattern is analyzed at a remote server. In any case, the computing device may identify, within the speckle pattern, one or more characteristics that are associated with user identification. In particular, the one or more characteristics may comprise elements of the speckle pattern that are influenced by the acoustic stimulation of the individual's finger.

For example, the acoustic stimulation of an individual's finger may cause the individual's finger bone to vibrate. The various unique characteristics of an individual's finger bone may influence the interaction of acoustic waves with the bone. For instance, an individual's finger bone may absorb, or dampen, specific, unique acoustic frequencies. In various embodiments, the unique interaction between an individual's finger bone, acoustic stimulation, and illumination by a laser may also generate a unique laser speckle pattern that accounts for unique characteristics of an individual's soft tissue and/or unique characteristics of an individual's bones.

Accordingly, a biometric authentication system that utilizes laser speckle patterns caused by acoustically stimulated tissue can provide several benefits. For example, the acoustic stimulation of an individual's bone can generate a unique speckle pattern that is influenced by unique surface and shape characteristics of the individual's finger bone. As such, embodiments of the above mentioned biometric authentication system may utilize biometric signatures that are extremely difficult to maliciously replicate because the biometric signatures rely upon minute differences in an individual's bones. In contrast, for example, an individual's fingerprint may be replicated from a picture of the individual's hand.

Figure 1:
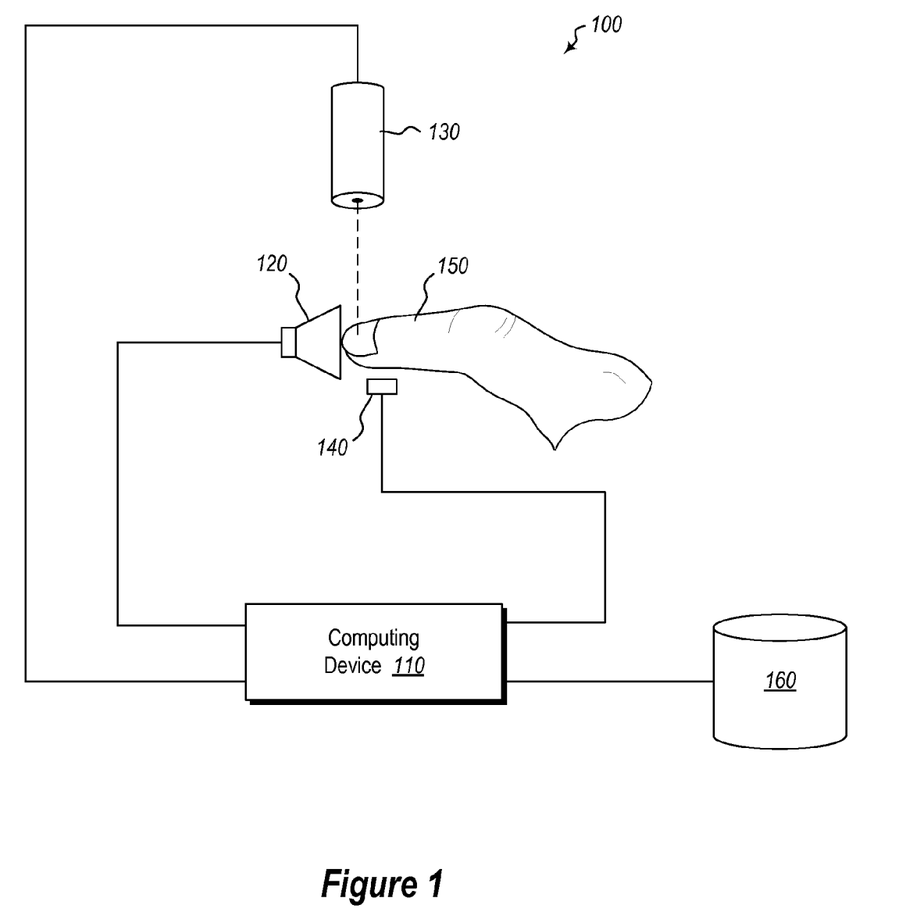
FIG. 1 illustrates a schematic of an embodiment of a biometric authentication system.

Turning now to the figures, FIG. 1 illustrates a schematic of an embodiment of a biometric authentication system 100. In at least one embodiment of a biometric authentication system 100, the system can be configured to actuate an acoustic transducer 120. The acoustic transducer 120 can be positioned such that it stimulates a target individual's finger 150. The acoustic transducer 120 can be configurable to transmit white noise, Gaussian noise, random noise, and/or specific frequencies of noise. In at least one embodiment, acoustic stimulation of tissue can include the acoustic stimulation of an individual's finger bone—causing the finger bone to vibrate.

A laser 130 can illuminate the stimulated tissue 150, causing a dynamic laser speckle pattern to be generated. The laser 130 may operate within a visible light spectrum, within an ultraviolet spectrum, an infrared spectrum, or any other spectrum suitable for generating a detectable speckle pattern. Additionally, the laser 130 can be configured to pulse light at specific frequencies and/or patterns (i.e., "frequency markers"). Modulating the laser 130 at the specific frequencies and/or patterns can make the resulting speckle pattern much more difficult to maliciously fake or manipulate.

For example, in at least one implementation, a computing device (e.g., one or more processors) 110 in communication with an optical sensing device 140 can determine whether the received speckle pattern demonstrates the specific frequency markers, such as frequencies and/or patterns of the laser light. If the received speckle pattern does not demonstrate the expected frequency markers, the speckle pattern can be discarded as potentially manipulated or faked. For instance, the laser 130 may alternate between different frequencies and/or patterns each time a biometric authentication is attempted. The computing device 110 may be aware of the particular frequency and/or pattern that the laser is utilizing each time. If the computing device 110 determines that the detected speckle pattern does not demonstrate the expected frequency markers, it may be due to a malicious actor attempting to utilize a previously recorded speckle pattern signal to inappropriately authenticate as a user. As such, utilizing one or more unique laser frequencies and patterns can generate a distinguishably unique speckle pattern for each authentication attempt.

Once the optical sensing device 140 has received an acceptable speckle pattern, the computing device can identify within the speckle pattern one or more characteristics. The identified characteristics may comprise phase information within the speckle pattern, frequency information within the speckle pattern, amplitude information within the speckle pattern, or any other derivable characteristics within the speckle pattern.

In at least one embodiment, the computing device 110 can identify within the speckle pattern one or more characteristics that relate to the acoustic stimulation of the individual's finger bone. For example, the computing device may identify within the speckle pattern frequency information that matches frequencies used by the acoustic transducer 120. Additionally, the computing device may identify that specific frequencies used by the acoustic transducer are attenuated more significantly than other frequencies used by the acoustic transducer. The attenuation of the specific frequencies may be due unique characteristics of the individual's finger bone.

Once the one or more characteristics within the speckle pattern have been identified, the computing device 110 can access a storage device 160 that contains one or more user biometric signatures and determine if the one or more characteristics match the one or more biometric signatures. The storage device 160 may be located within the same device as the optical receiving device 140 or it may be located at a remote storage device that is network accessible by the computing device 110. In at least one embodiment of the biometric authentication system 100, the biometric signature is encrypted, or otherwise securely stored, to prevent the signature from being improperly accessed.

If the computing device identifies a match within the stored one or more user biometric signatures, the computing device 110 can authenticate the individual (i.e., "the user") within a computer system. The biometric authentication system 100 described herein may be utilized in a wide variety of different situations. For example, the biometric authentication system 100 may be used to authenticate a user on a mobile device, within an electronic payment system, within a building security system, or within any other system capable of verifying a user's identity.

Figure 2:
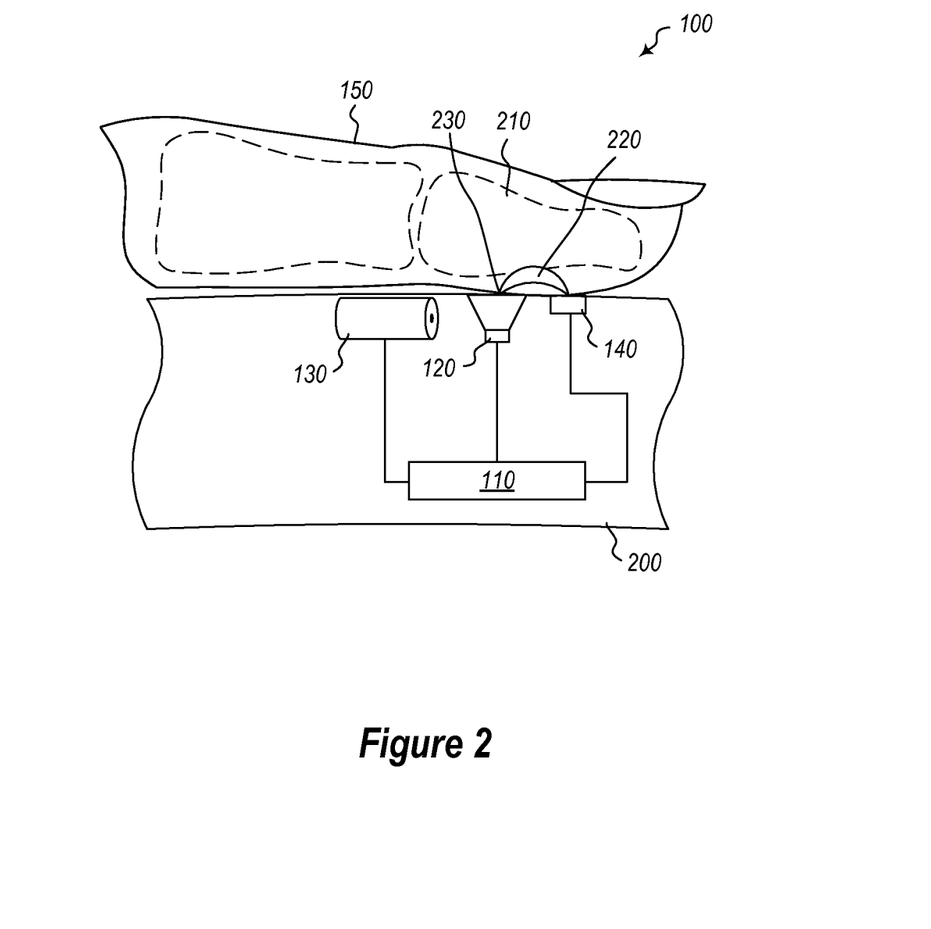
FIG. 2 illustrates a side-view of an embodiment of a biometric authentication system embedded within a hardware device.

FIG. 2 illustrates a side-view of an embodiment of a biometric authentication system 100 embedded within a biometric security device 200. As depicted, the various components 110, 120, 130, 140 of the biometric authentication system 100 can be positioned in a variety of different configurations. For example, in FIG. 1, the laser 130 is above the finger 150, the acoustic actuator 120 is directed towards the tip of the finger 150, and the optical sensing device 140 is positioned below the finger 150. In contrast, in FIG. 2 all of the components 110, 120, 130, 140 are positioned below the finger 150 such that a biometric reading can be received from a finger placed within a tissue receiving portion 230 on the biometric security device 200.

In at least one embodiment of the biometric authentication system 100, the optical sensing device 140 and the acoustic transducer 120 are positioned within an optimal distance from each other. In particular, the optical sensing device 140 may be positioned at a focus point of acoustic signal with respect to the acoustic transducer 120. As stated above, the acoustic transducer 120 may be configured to project an acoustic wave 220 into the finger 150. In at least one embodiment, at least a portion of the acoustic wave 220 may deflect and change course as it travels through the layers of tissue of the finger 150 and reflects off of a finger bone 210. The reflected acoustic wave 220 may then travel back towards the surface of the finger 150. In some embodiments, the initial travel path and reflected travel path of at least a portion of the acoustic wave 220 may form a banana-shaped acoustic wave 220. The optical sensing device 140 may receive a laser speckle pattern that comprises more information associated with the acoustic wave 220 if the optical sensing device 140 is positioned at the exit point of the banana-shaped acoustic wave 220 (i.e., the focus point). The exit point of the banana-shaped acoustic wave 220 may be identifiable through simple experimentation and/or calculation. Additionally, the shape and positioning of the banana-shaped acoustic wave may be generally the same across a wide-array of users such that a general positioning between the acoustic transducer 120 and optical sensing device 140 may be used across a wide-array of generic devices.

Figure 3A:
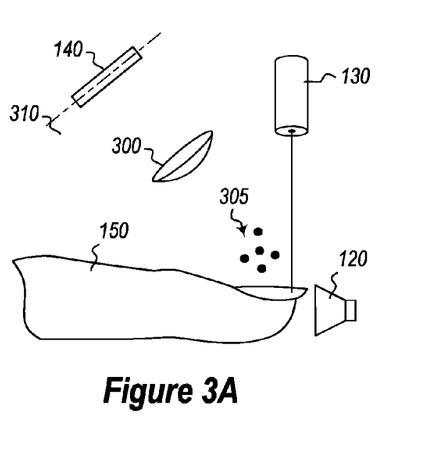
FIG. 3A illustrates a schematic of an embodiment of a biometric authentication system.

In various embodiments, the biometric authentication system may position the various components 110, 120, 130, 140 in a variety of different configurations that may each provide different advantages. For example, FIG. 3A illustrates a schematic of an embodiment of a biometric authentication system comprising a lens 300. In the depicted embodiment, the optical sensing device 140 receives the speckle pattern 305 through a lens 300 that is positioned between the optical sensing device 140 and the stimulated tissue 150. The optical sensing device 140 may be positioned such that it is within an image plane 310 of the lens 300 with respect to the speckle pattern 305.

Due to its position within the image plane 310, the optical sensing device 140 may receive a two-dimensional image of the speckle pattern. To accommodate the two-dimensional image, the optical sensing device can comprise an array of optical sensors. In at least one embodiment, an optical sensing device 140 positioned within an image plane is more sensitive to translational movements of the finger 150 and/or finger bone 210 than an optical sensing device 140 positioned outside of the image plane 310.

Figure 3B:
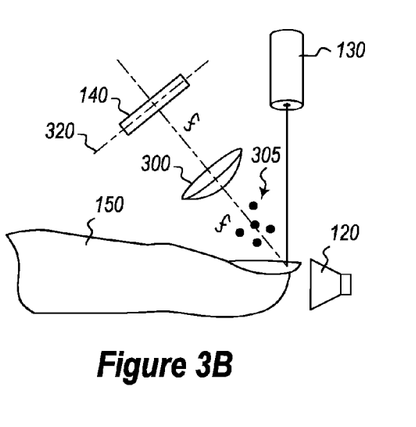
FIG. 3B illustrates a schematic of an embodiment of a biometric authentication system.

As an additional embodiment of a biometric authentication system, FIG. 3B illustrates a schematic of an embodiment of a biometric authentication system comprising a lens 300 positioned between a finger 150 and an optical sensing device 140. The optical sensing device 140 is positioned within a focal plane 320 of the lens 300. In at least one embodiment, the lens 300 can function as a summation mechanism for optical sensing devices 140 positioned within the focal plane. For example, the optics of the lens 300 may cause optical sensing device 140 to receive a summation of phases and intensities from the speckle pattern 305. As such, in at least one embodiment, the lens 300 may provide a helpful mathematical function for analyzing the laser speckle pattern by providing a summation of characteristics of the speckle pattern. Additionally, in at least one implementation, the optics of the lens 300 allows a single photodetector to be used as the optical sensing device 140.

Figure 3C:
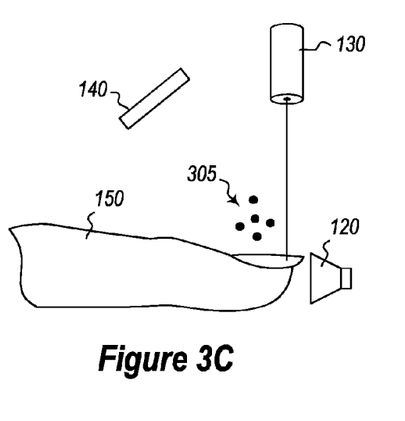
FIG. 3C illustrates a schematic of an embodiment of a biometric authentication system.

As another embodiment of a biometric authentication system, FIG. 3C illustrates a schematic of an embodiment of a biometric authentication system that does not comprise a lens 300, but instead utilizes just the optical sensing device 140 to detect the speckle pattern 305. In order to function properly, the absence of the lens 300 may require that a higher intensity laser 130 be used to illuminate the finger 150 and/or that a higher sensitivity optical receiving device 140 be used to receive the speckle pattern 305. As such, the embodiment depicted in FIG. 3C allows for manufacturing cost decisions to be accounted for in designing a biometric authentication system. For example, an appropriate lens 300 may cost significantly more than a higher powered laser 130 and/or a more sensitive optical detecting device 140. Accordingly, in at least one embodiment a designer can lower the overall cost of the biometric authentication system by not using a lens 300.

Figure 3D:
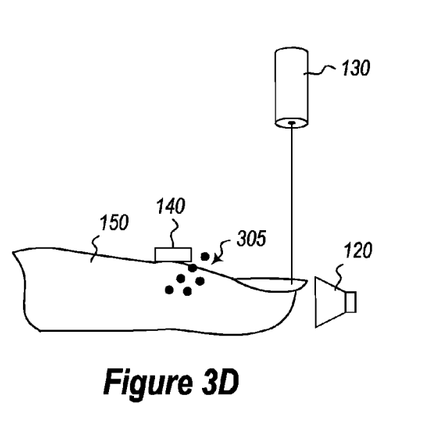
FIG. 3D illustrates a schematic of an embodiment of a biometric authentication system.

As yet another embodiments of a biometric authentication system, FIG. 3D illustrates a schematic of an embodiment of a biometric authentication system that utilizes reflectance within the finger 150 to receive information relating to the speckle pattern. In particular, the optical sensing device 140 is positioned directly adjacent to the stimulated tissue 150. The optical sensing device 140 can receive the dynamic speckle pattern 305 through reflectance of the laser within the stimulated tissue 150. As such, embodiments of a biometric authentication system can place all of the necessary components 120, 130, 140 of the system on the same side of the finger 150—this may allow for more useful design configurations for end-user devices.

Figure 3E:
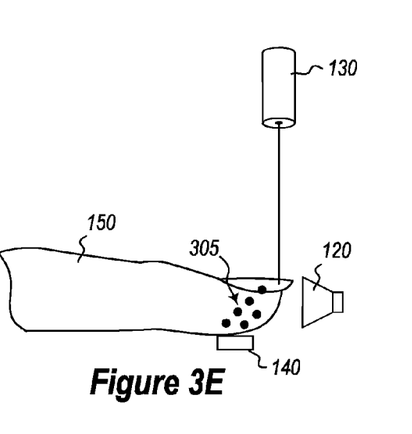
FIG. 3E illustrates a schematic of an embodiment of a biometric authentication system.

FIG. 3E illustrates a schematic of an embodiment of a biometric authentication system that utilizes transmittance of the laser speckle pattern through the finger 150. In particular, the stimulated tissue (i.e., the finger 150) is positioned between the laser 130 and the optical sensing device 140. The optical sensing device 140 can then receive the speckle pattern 305 through transmittance of the laser through the stimulated tissue 150.

Figure 3F:
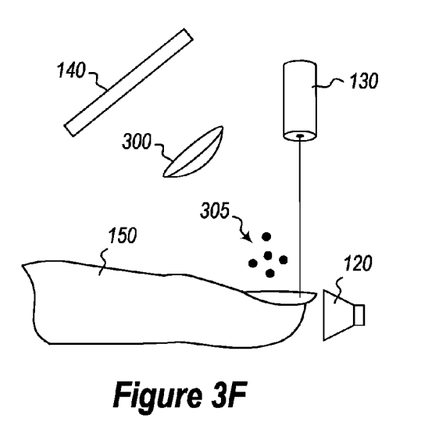
FIG. 3F illustrates a schematic of an embodiment of a biometric authentication system.

FIG. 3F illustrates a schematic of an embodiment of a biometric authentication system that utilizes a lens 300 and an optical sensing device 140 that comprises image sensor array 140 to receive the speckle pattern 305. In various embodiments, the image sensing array may comprise a charge-coupled device (CCD), a complementary metal-oxide-semiconductor (CMOS), or any other suitable imaging array. In at least one implementation, the image sensor array 140 may comprise a camera that is integrated within a mobile device, such as a smart phone or tablet.

While the above described embodiments of biometric authentication systems depict and describe various different configurations, the examples are not meant to limit embodiments of biometric authentications systems to only those depicted. Various alternate implementations may be otherwise configured to meet the particular needs of a given design. Additionally, while the previous examples depict the laser 130 illuminating a finger nail, in various alternate embodiments, the laser 130 may be directed towards any portion of the user's tissue.

Figure 4:
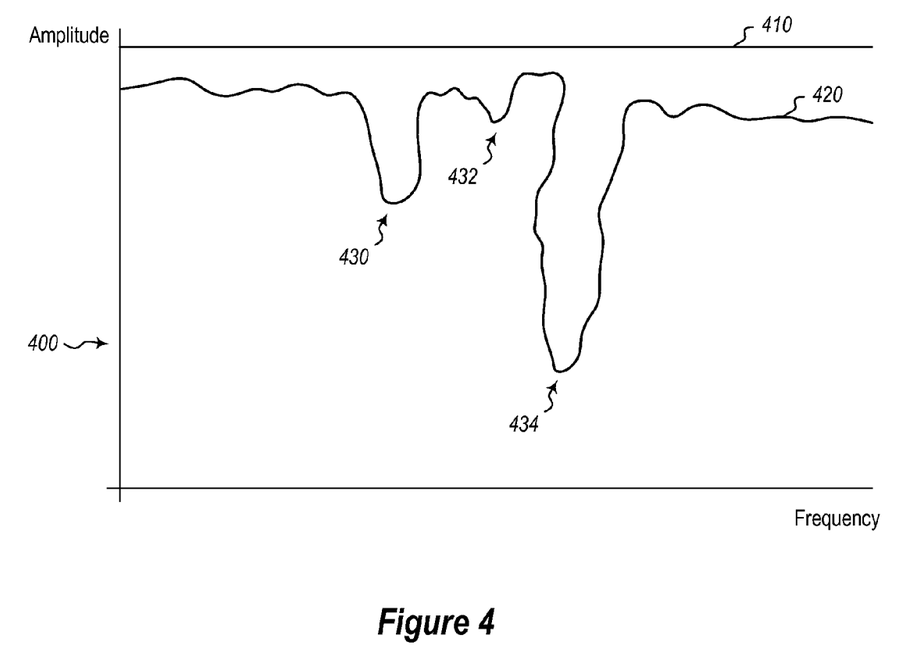
FIG. 4 illustrates a chart depicting an embodiment of a Fourier transform of a laser speckle pattern and an acoustic signal.

Turning now to various different embodiments of signal processing that can be used to match a speckle pattern to a particular individual, FIG. 4 illustrates a chart 400 depicting an embodiment of a Fourier transform of a laser speckle pattern 420 and an acoustic signal 410. As depicted, the acoustic signal 410 comprises white noise of equal intensity across the spectrum of interest. In alternate embodiments, however, the acoustic signal may comprise random noise, specific frequency ranges, or any other signal spectrum.

The depicted Fourier transform of the speckle pattern 420 comprises multiple exemplary characteristics 430, 432, 434. In particular, the depicted characteristics 430, 432, 434 comprise ranges of frequency where the relative amplitude of the Fourier transform of the speckle pattern 420 drops. In at least one embodiment, the drops 430, 432, 434 may occur based upon the specific interactions of the acoustic frequencies produced by the acoustic transducer and the individual's finger bone. Speckle patterns from different individuals may demonstrate different specific frequency attenuations. As such, the characteristics 430, 432, 434 may be utilized to verify the identity of an individual by matching the detected characteristics with a biometric signature stored within a database.

While the above example describes the use of attenuation points 430, 432, 434 in a signal 420 as being characteristics, in various alternate embodiments other aspects of a received speckle pattern can be used to identify an individual. For example, specific phase changes, specific intensity changes, a wavelet transform, similarities in a Fourier transform, correlation between speckle patters, or other similar signal analysis techniques can be used to match a specific speckle pattern to a particular user. In each of the various methods for identifying a user, a specific threshold or confidence factor can be built into the user authentication process such that matches must have a pre-determined level of precision to be acceptable. As described above, the acoustic signal 410 can also be utilized in identifying an individual. In particular, the interaction of the acoustic signal with an individual's tissue can effect a resulting speckle pattern. In various embodiments, knowledge of the acoustic signal characteristics can assist in identifying a user based upon a received speckle pattern. For example, a sine wave or a chirp signal can be used within the acoustic signal to identify the acoustically influenced aspects of the speckle pattern.

Additionally, in at least one embodiment of a biometric authentication system, a specific acoustic signal can be utilized to identify an individual. For example, upon initially attempting to authenticate within a computing system, an individual can enter a username associated with the individual within the computing system. The individual can then place a finger within a tissue receiving portion of the biometric authentication system. Upon receiving the individual's username, a computing device can direct an acoustic transducer to emit a specific set of frequencies that are associated with the username. The specific frequencies may be selected based upon a previously identified set of frequencies that exhibit a particularly pronounced response from the individual.

In addition, the specific frequencies may also include one or more control signals. The control signals may comprise specific acoustic frequencies that are applied to all individuals by the particular biometric authentication system. When authenticating the individual, the computing device may first identify the presence of the control signals within the speckle pattern. The identification of the control signals can be used to verify that the system is properly functioning and also to potentially identify signal spoofing. After identifying the presence of the control signals within the speckle pattern, the computing device can then authenticate the individual against the user's known biometric signature, which is associated with the username. In particular, the computing device can identify the particular pronounced responses that are associated with the specific frequencies that are associated with the individual's username. As such, in various embodiments, unique acoustic signals can be utilized to authenticate an individual based upon an initial user identification of the user.

In various embodiments of a biometric authentication system, the biometric signatures can comprise multiple matrices that each contain signal amplitudes over a specific range of frequencies. Each matrix can represent the biometric signature of a user, in the form of stored frequency data from the respective user's speckle pattern. As such, upon receiving and processing the speckle pattern, the computing device can compare the amplitude and frequency information of the received speckle pattern to the various biometric matrices and identify a nearest match. The computing device can then determine whether the nearest match falls within an acceptable threshold or confidence factor. If the match falls within the acceptable threshold or confidence factor, the computing device can authenticate the user. Otherwise, the computing device can deny authentication.

Figure 5:
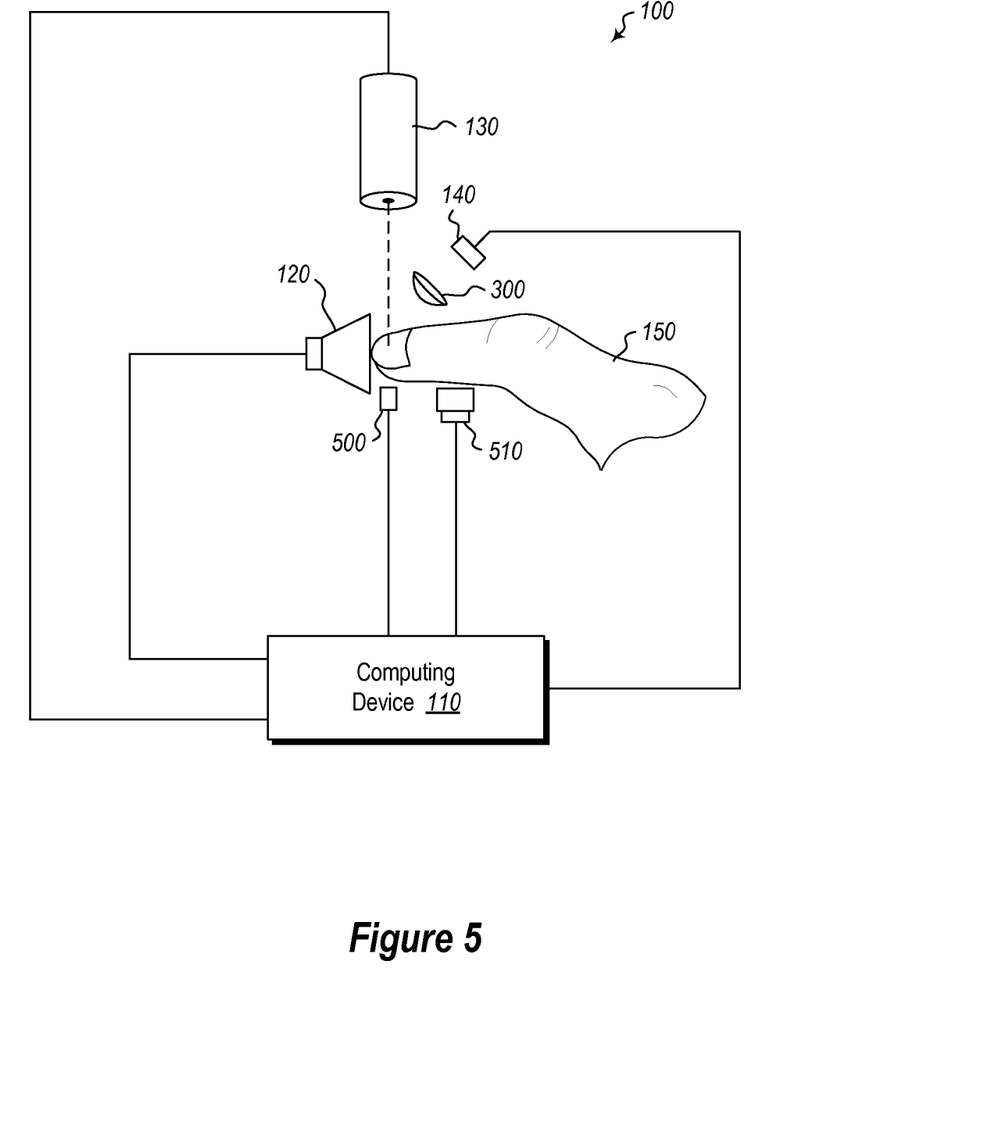
FIG. 5 illustrates a schematic of an embodiment of a biometric authentication system.

In addition to relying upon an acoustic signal's interaction with a finger bone, in various implementations additional biometric information may be utilized to authenticate a user. For example, FIG. 5 illustrates a schematic of an embodiment of a biometric authentication system 100 that also comprises pulse oximetry components 500, 510. In particular, the biometric system 100 comprises an optical sensor 500 and a photoelectric device 510. One of skill in the art will understand the functioning of the pulse oximetry system in its various embodiments. One or more components of the laser speckle pattern components 120, 130, 140 and the pulse oximetry components 500, 510 may be shared between the two systems. For example, the optical sensor 500 and the optical sensing device 140 may comprise the same component such that a single sensing device is receiving both pulse oximetry information and laser speckle pattern information.

The use of additional biometric information may be useful to further verify the identity of a user and to avoid spoofing of biometric information. For example, in the embodiment described above, the pulse oximetry information may be useful for verifying the presence of a pulse with the accompanying laser speckle pattern. The presence of a pulse may indicate that the laser speckle pattern is being generated by actual living tissue.

In addition to the use of pulse oximetry, in various embodiments, other biometric information may be used to authenticate a user. For example, the biometric authentication system 100 can capture photographs of a fingerprint, capture fingerprint information through laser speckle analysis, capture finger print information from a capacitive analysis, retinal scanning, voice recognition, or any number of other biometric techniques. As such, embodiments of the laser speckle biometric authentication system can be incorporated into a wide variety of other security schemes.

Accordingly, FIGS. 1-5 and the corresponding text illustrate or otherwise describe one or more components, modules, and/or mechanisms for biometric authentication using a speckle pattern generated by acoustically stimulated tissue. One will appreciate that implementations of the present invention can also be described in terms of computer-executable instructions within a computing system that when executed comprise one or more acts for accomplishing a particular result. For example, FIG. 6 and the corresponding text illustrate or otherwise describe a sequence of acts from instructions within a computing system for authenticating a user with a laser speckle biometric pattern. The acts of FIG. 6 are described below with reference to the components and modules illustrated in FIGS. 1-5.

Figure 6:
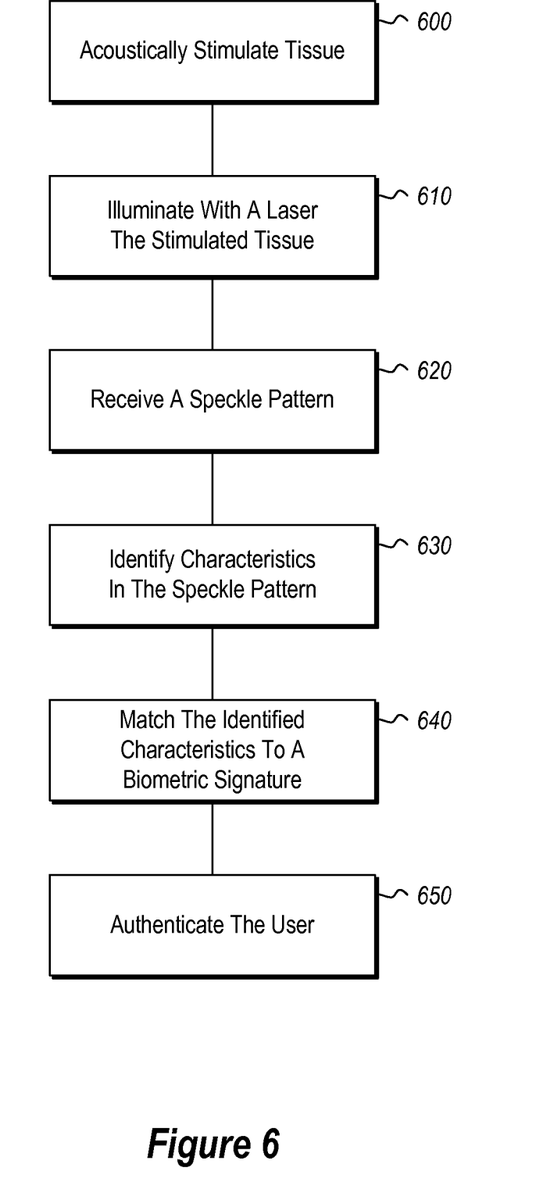
FIG. 6 illustrates a flowchart for an embodiment of a method for biometric authentication.

For example, FIG. 6 demonstrates that a system for biometric authentication using a speckle pattern generated by acoustically stimulated tissue can comprise computer-executable instructions that when executed comprise an act 600 of acoustically stimulated tissue. Act 600 can include acoustically stimulating, with an acoustic transducer 120, tissue belonging to an individual. For example, as described in FIG. 2 and the accompanying description, an acoustic transducer 120 can stimulate an individual's finger 150 and/or finger bone 210. The acoustic transducer may comprise a speaker, a piezoelectric transducer, an electromagnetic acoustic transducer, or any other component capable of electronically generating an acoustic wave.

Additionally, FIG. 6 shows that the system can include computer-executable instructions that when executed comprise an act 610 of illuminating with a laser the stimulated tissue. Act 410 can include illuminating with a laser 130 at least a portion of the stimulated tissue. For example, as described in FIG. 1 and the accompanying description, laser 130 illuminates the individual's finger 150 with a laser. During at least a portion of the illumination, the user's finger 150 is being stimulated by the acoustic transducer 120.

FIG. 6 also shows that the system can include computer-executable instructions that when executed comprise an act 620 of receiving a speckle pattern. Act 620 can include receiving at an optical sensing device 140 a speckle pattern generated by the laser's interaction with the stimulated tissue. For example, as described in FIG. 1 and the accompanying description, the optical sensing device 140 can receive a laser speckle pattern generated by the laser's interaction with the finger 150. In various embodiments described above, the optical sensing device 140 can be positioned in a variety of different location with respect to the finger 150, the laser 130, and the acoustic transducer 120.

Additionally, FIG. 6 shows that the system can include computer-executable instructions that when executed comprise an act 630 of identifying characteristics in the speckle pattern. Act 630 includes identifying at a computing device one or more characteristics within the received speckle pattern. For example, as described in FIG. 4 and the accompanying description, a speckle pattern can be processed with a Fourier Transform and analyzed to identify various characteristics. For example, the frequency-domain chart of FIG. 4 depicts three characteristics 430, 432, 434 in the form of distinct frequencies that are attenuated relative to other frequencies.

Further, FIG. 6 shows that the system can include computer-executable instructions that when executed comprise an act 640 of matching the identified characteristics to a biometric signature. Act 640 includes identifying a match of the one or more characteristics to a user biometric signature stored within a storage device. For example, as described in FIG. 1 and the accompanying description, upon identifying characteristics within the laser speckle pattern (e.g., characteristics 430, 432, 434), the computing device 110 can access a storage device 160 that stores one or more user biometric signatures. The computing device 110 can then match the identified characteristics to a biometric signature stored within the storage device 160.

Further still, FIG. 6 shows that the system can include computer-executable instructions that when executed comprise an act 650 of authenticating a user. Act 650 can include based upon the identified match, authenticating a user within a computer system. For example, upon identifying a matching biometric signature within the storage device 160, the computing device 110 can authenticate a user within a computer system by providing the user with appropriate permissions within the computer system, unlocking the computer system, allowing the user to access assets within the computer system, or otherwise authenticate the user within the computer system.

Figure 7:
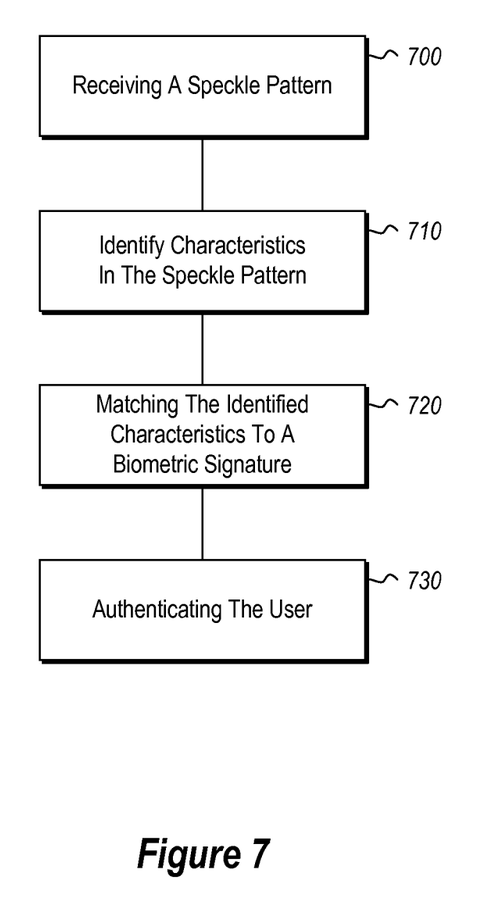
FIG. 7 illustrates another flowchart for an embodiment of a method for biometric authentication.

In addition to the foregoing, FIG. 7 depicts that an additional or alternative embodiment of a biometric authentication system can comprise a method for biometric authentication using a speckle pattern generated by acoustically stimulated tissue. The method can comprise an act 700 of receiving a speckle pattern. Act 700 can include receiving at an optical sensing device 140 a speckle pattern generated by the laser's interaction with the stimulated tissue. For example, as described in FIG. 1 and the accompanying description, the optical sensing device 140 can receive a laser speckle pattern generated by the laser's interaction with the finger 150. In various embodiments described above, the optical sensing device 140 can be positioned in a variety of different locations with respect to the finger 150, the laser 130, and the acoustic transducer 120.

Additionally, FIG. 7 shows that the method can comprise an act 710 of identifying characteristics in the speckle pattern. Act 710 includes identifying at a computing device one or more characteristics within the received speckle pattern. For example, as described in FIG. 4 and the accompanying description, a speckle pattern can be processed with a Fourier Transform and analyzed to identify various characteristics. For example, the frequency-domain chart of FIG. 4 depicts three characteristics 430, 432, 434 in the form of distinct frequencies that are attenuated relative to other frequencies.

Further, FIG. 7 shows that the method can comprise an act 720 of matching the identified characteristics to a biometric signature. Act 720 includes identifying a match of the one or more characteristics to a user biometric signature stored within a storage device. For example, as described in FIG. 1 and the accompanying description, upon identifying characteristics within the laser speckle pattern (e.g., characteristics 430, 432, 434), the computing device 110 can access a storage device 160 that stores one or more user biometric signatures. The computing device 110 can then match the identified characteristics to a biometric signature stored within the storage device 160.

Further still, FIG. 7 shows that the method can comprise an act 730 of authenticating a user. Act 730 can include based upon the identified match, authenticate a user within a computer system. For example, upon identifying a matching biometric signature within the storage device 160, the computing device 110 can authenticate a user within a computer system by providing the user with appropriate permissions within the computer system, unlocking the computer system, allowing the user to access assets within the computer system, or otherwise authenticate the user within the computer system Accordingly, embodiments of the above-described biometric authentication system can provide significant benefits over conventional authentication schemes. For example, acoustic stimulation of an individual's finger bone can generate identifiable characteristics within an associated speckle pattern that are the result of minute differences in the individual's finger bone. In contrast to a fingerprint, which can be surreptitiously gathered from a photo or touched surfaces, an individual's finger bone is completely obscure. Further, several means exist to reproduce an individual's fingerprint, such as a simple photograph. In contrast, no such readily available means exist to exactly reproduce an individual's finger bone. As such, embodiments of a biometric authentication system for biometric authentication using a speckle pattern generated by acoustically stimulated tissue can provide significant improvements to the field.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" first boundary, "a" first decorative feature, "a" first image, and the like, one or more of any of these items is within the scope of the invention. In addition, in this application, the use of "or" means "and/or" unless specifically stated otherwise, even though "and/or" may be explicitly used in certain instances. "Including", "such as", "for example" and like terms means "including/such as/for example but not limited to".

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A biometric security system for authenticating a user seeking to access a secure system, the biometric security system comprising:
   a biometric authentication apparatus comprising:
      a tissue-receiving location on the apparatus at which a user seeking to access a secure system presents some portion of the user's biological tissue,
      an acoustic transducer positioned near the tissue-receiving location, the acoustic transducer acoustically stimulating the portion of the user's biological tissue presented at the tissue-receiving location;
      a laser device outputting light at specific modulated frequencies or patterns, the laser device positioned near the tissue-receiving location in order to use the output light to generate a speckle pattern based on the portion of the user's acoustically stimulated biological tissue presented at the tissue-receiving location, and wherein the specific frequencies or patterns of modulated light produce one or more specific frequency markers based on the speckle pattern that are unique to the portion of the user's acoustically stimulated biological tissue presented at the tissue-receiving location; and
      an optical sensing device positioned to receive the generated speckle pattern; and
   one or more processors which compare the one or more specific frequency markers obtained for the user from the speckle pattern produced at the biometric authentication apparatus with one or more previously stored frequency markers for the user in order to determine if there is a match between the compared frequency markers, and if so, granting authentication to the user to access the secure system.

2. The biometric security device as recited in claim 1, wherein the tissue-receiving portion of the biometric security device is configured to receive at least a portion of a finger.

3. The biometric security device as recited in claim 1, wherein the optical sensing device comprises a single photodetector.

4. The biometric security device as recited in claim 1, further comprising a lens positioned between the stimulated tissue and the optical sensing device.

5. The biometric security device as recited in claim 4, wherein the optical sensing device is positioned within a focal plane of the lens.

6. The biometric security device as recited in claim 1, wherein the optical sensing device is positioned at a focus point of acoustic signal with respect to the acoustic transducer.

7. A computing system comprising:
   one or more processors;
   one or more storage devices having stored thereon computer-executable instructions that are executable by the one or more processors, and that configure the system to identify a user through a biometric signature, including computer-executable instructions that configure the computer system to perform at least the following:
      acoustically stimulate, with an acoustic transducer, tissue belonging to an individual;
      illuminate with a laser at least a portion of the stimulated tissue;
      receive at an optical sensing device a speckle pattern generated by the laser's interaction with the stimulated tissue;
      wherein the laser is configured to operate with a pre-defined set of frequency markers that are detectable within the received speckle pattern, and identify one or more of the frequency markers within the received speckle pattern;
      identify a match of the one or more frequency markers to a biometric signature of the individual stored within a storage device; and
      based upon the identified match, authenticate the individual as an authorized user of the computer system.

8. The system as recited in claim 7, wherein the optical sensing device is configured to receive the speckle pattern through a lens positioned between the optical sensing device and the stimulated tissue.

9. The system as recited in claim 8, wherein the optical sensing device is positioned within a focal plane of the lens.

10. The system as recited in claim 8, wherein the optical sensing device is positioned within an image plane of the lens with respect to the stimulated tissue.

11. The system as recited in claim 7, wherein the stimulated tissue comprises a finger bone.

12. The system as recited in claim 7, wherein the optical sensing device is positioned on an opposing side of the stimulated tissue from the laser, and the optical sensing device is configured to receive the speckle pattern through transmittance of the laser within the stimulated tissue.

13. The system as recited in claim 7, wherein the optical sensing device is positioned adjacent to the stimulated tissue, and the optical sensing device is configured to receive the speckle pattern through reflectance of the laser within the stimulated tissue.

14. The system as recited in claim 7, wherein the optical sensing device comprises only a single photodetector.

15. The system as recited in claim 7, wherein the optical sensing device comprises an image sensor array.

16. The system as recited in claim 7, wherein the computer-executable instructions are further configured to:
   receive from the individual an initial user identification; and
   based upon the initial user identification, acoustically stimulate the tissue with the specific set of pre-defined frequency markers.

17. The system as recited in claim 7, wherein the computer-executable instructions are further configured to:
   receive pulse oximetry data from the tissue; and
   detect a pulse before authenticating the individual as an authenticated user.

18. A computer-implemented method performed by one or more processors executing computer-executable instructions for authenticating an individual seeking to access a secure system, the computer-implemented method comprising:
   receiving from an individual an initial user identification;
   based upon the initial user identification, acoustically stimulating tissue belonging to the individual with a specific set of frequencies;
   illuminating with a laser at least a portion of the stimulated tissue;
   receiving at an optical sensing device a speckle pattern generated by the laser's interaction with the stimulated tissue, wherein one or more unique characteristics within the received speckle pattern are generated by the specific set of frequencies used to acoustically stimulate the tissue of the individual;
   identifying a match of the one or more unique characteristics to a biometric signature of the individual stored within a storage device; and
   based upon the identified match, authenticating the individual as an authorized user of the secure system.

19. The computer-implemented method as recited in claim 18, further comprising:
   receiving pulse oximetry data from the stimulated tissue; and
   detecting a pulse before authenticating the individual as an authenticated user.

20. The computer-implemented method as recited in claim 19, wherein the pulse oximetry data and the speckle pattern are received at a single device.

21. The computer-implemented method as recited in claim 18, wherein the received speckle pattern is generated by one or both of reflectance by the stimulated tissue or transmittance through the stimulated tissue.

* * * * *